United States Patent [19]

Paul et al.

[11] Patent Number: 5,136,979
[45] Date of Patent: Aug. 11, 1992

US005136979A

[54] MODULAR INJECTION SYSTEM FOR AVIAN EMBRYOS

[75] Inventors: Eric A. Paul, Cary; Robert L. Ilich, Wake Forest, both of N.C.

[73] Assignee: Embrex, Inc., Research Triangle Park, N.C.

[21] Appl. No.: 765,426

[22] Filed: Sep. 25, 1991

[51] Int. Cl.[5] .................................... A01K 45/00
[52] U.S. Cl. ............................................ 119/6.8
[58] Field of Search ................... 119/6.8, 6.6, 174

[56] References Cited

U.S. PATENT DOCUMENTS

| | | | |
|---|---|---|---|
| 2,477,752 | 8/1949 | Kiss | 119/6.8 |
| 2,762,365 | 9/1956 | Wagner et al. | 119/6.8 |
| 3,377,989 | 4/1968 | Sandhage et al. | 119/6.8 |
| 3,594,285 | 7/1971 | Noren | 119/6.8 |
| 3,616,262 | 10/1971 | Coady et al. | 119/6.8 |
| 4,019,430 | 4/1977 | Warren | 119/6.8 |
| 4,040,388 | 8/1977 | Miller | 119/6.8 |
| 4,469,047 | 9/1984 | Miller | 119/6.8 |
| 4,593,646 | 6/1986 | Miller et al. | 119/6.8 |
| 4,681,063 | 7/1987 | Hebrank | 119/6.8 |
| 4,903,635 | 2/1990 | Hebrank | 119/6.8 |
| 4,928,628 | 5/1990 | Gassman et al. | 119/6.8 |
| 4,928,629 | 5/1990 | Trampel | 119/6.8 |
| 5,056,464 | 10/1991 | Lewis | 119/6.8 |

*Primary Examiner*—John G. Weiss
*Attorney, Agent, or Firm*—Bell, Seltzer, Park & Gibson

[57] ABSTRACT

An injection apparatus that is particularly suitable for accurate and precise injection of eggs of varying sizes and that may be presented to the injection apparatus in somewhat different orientations. The injection apparatus comprises a generally horizontally oriented tooling plate with an opening therethrough, an injector resting generally vertically in the opening in the tooling plate with a lower portion of the injector depending downwardly below the tooling plate and an upper portion of the injector resting at or above the tooling plate. Means are included for raising and lowering the tooling plate and the injector therewith so that when the plate is lowered and the lower portion of the resting injector strikes an egg to be injected, the resting injector stops while the tooling plate proceeds downwardly until the injector disengages from the tooling plate and is free to move in a translational direction independent of said tooling plate. When the tooling plate is raised it reengages the injector and carries it upwardly and away from the egg.

21 Claims, 3 Drawing Sheets

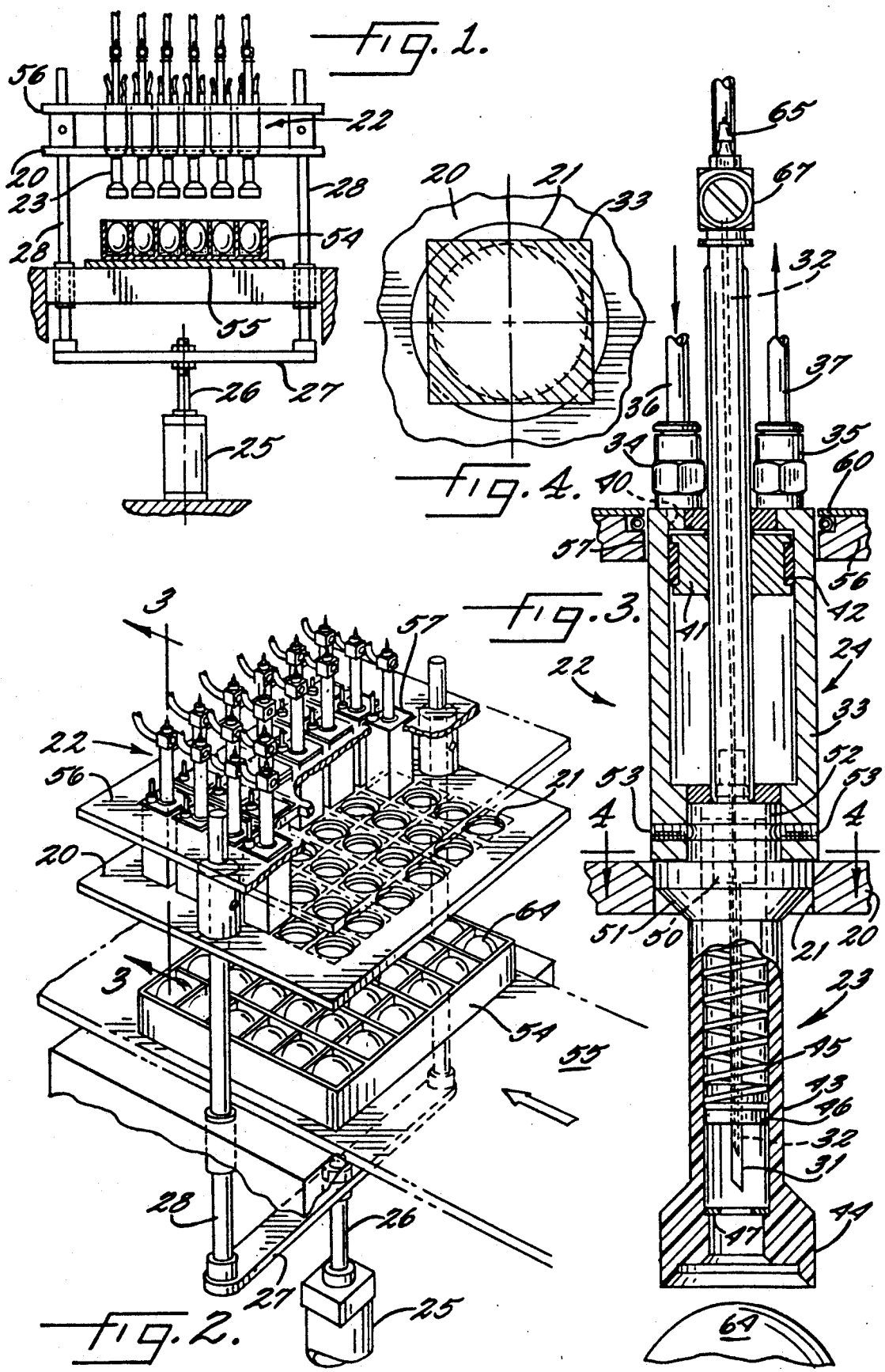

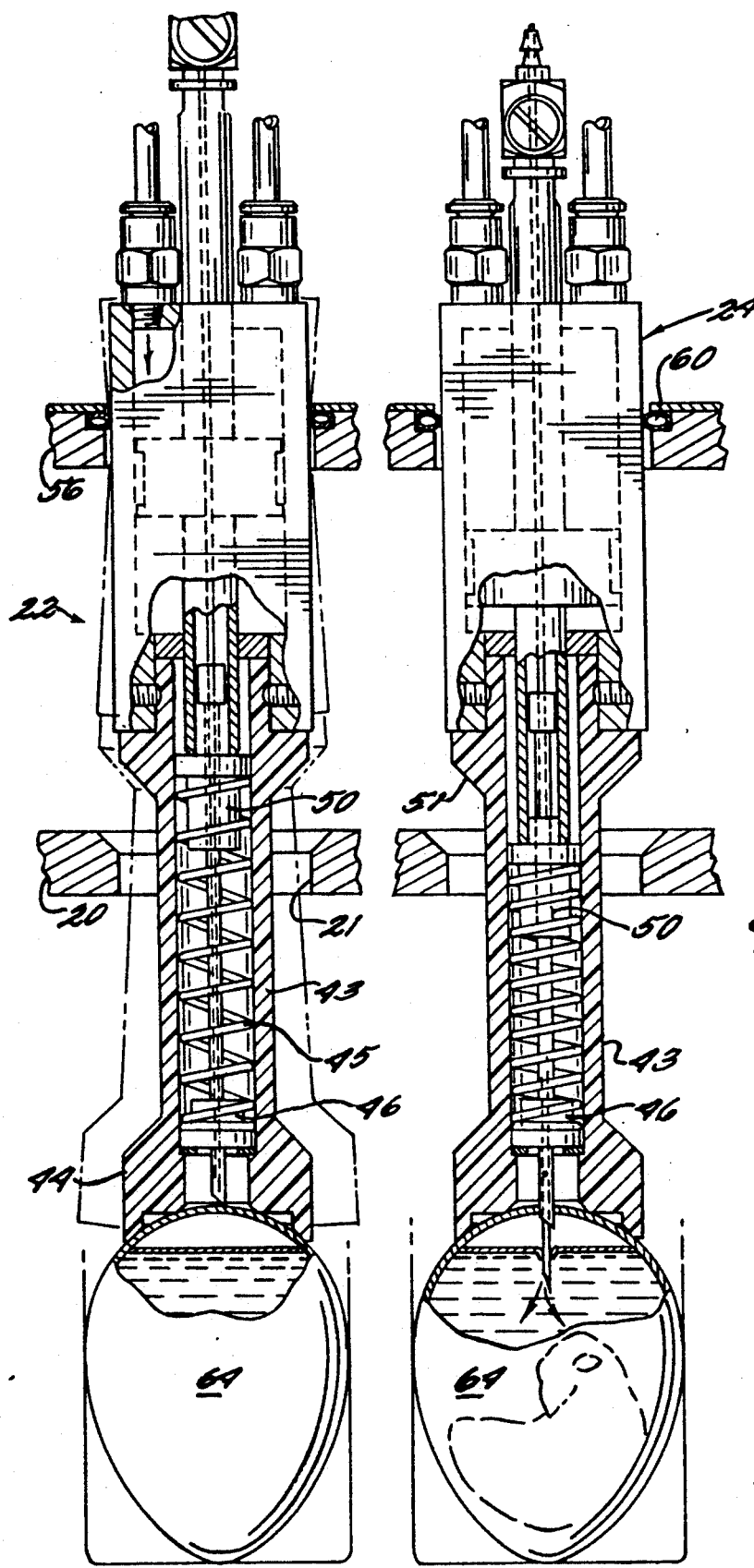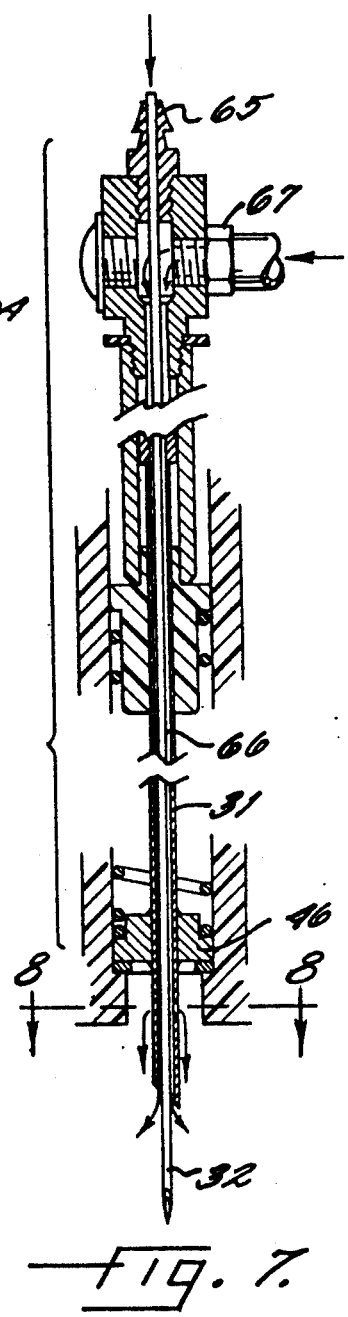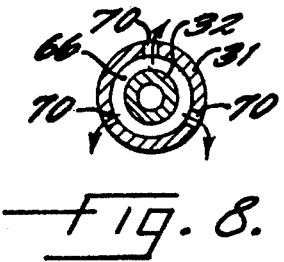
fig. 5.   fig. 6.   fig. 7.   fig. 8.

MODULAR INJECTION SYSTEM FOR AVIAN EMBRYOS

FIELD OF THE INVENTION

The present invention relates to the injection of avian embryos, and in particular relates to an injection apparatus and associated method in which individual eggs are injected from floating injection modules in which each module can orient itself both horizontally and vertically to an individual egg even where the eggs are of different sizes and may be presented in slightly different orientations to the other modules. Using the invention, each individual egg is injected as closely as possible to a desired location, both horizontally and vertically, and a plurality of eggs can be concurrently accurately and precisely injected regardless of the individual differences in size and orientation.

BACKGROUND OF THE INVENTION

The desirability of injecting eggs has been recognized for some time. Initially, the purpose of injecting eggs was to prepare various vaccines using the egg as a growth medium for the vaccine. The vaccine was then harvested from the egg and used as desired.

More recent developments have aimed at injecting live eggs for the purpose of accomplishing some beneficial or therapeutic affect on the bird that will eventually hatch from the egg. One main advantage of injecting the egg rather than the live bird is basically related to the ease of injection. Eggs can be kept immobile and handled rather efficiently in comparison to newborn or older birds. Furthermore, in addition to the mechanical ease of injecting eggs, there also appear to be certain therapeutic advantages in either inoculating or otherwise treating embryos rather than live birds. These advantages have become particularly important in the poultry industry i.e., for chickens and turkeys.

Given the desirability of injecting eggs for both of the described purposes, several basic techniques have been attempted. These generally include either forcing fluids through the shell of an egg using some sort of pressurization system or physically forming an opening in the shell of an egg and then adding the desired fluid. In turn, injection using some type of needle arrangement has been one of the basic techniques for physically opening an egg for such purposes.

One goal of the devices that physically inject fluids is to deliver the fluid to a consistent position—i.e. vertically and horizontally—within each egg. For example, merely opening the top of an egg and delivering fluid into the air sack above the amniotic fluid is not appropriate for delivery of all substances. Some substances, in order to be effective, must be delivered directly into the amniotic fluid. Such delivery, however, raises an additional risk that when the injection device, commonly a needle, enters the amniotic fluid it risks injuring or even destroying the live embryo therein.

Therefore, a device which has the goal of injecting a large number of eggs on a relatively rapid basis, and of doing so while delivering a fluid substance to the same location within each egg, particularly when desired into the amniotic fluid, must deal with the reality that eggs, although generally of similar size, are not identical in size, even if taken from identical types of birds. The differences in size are particularly magnified compared to the normal operation of any well constructed machine in which the movement of the various parts is rather precisely and accurately governed by the physical parameters of the machine.

To date, there have been a number of attempts to orient eggs and injection devices with respect to one another so that each individual egg can be injected accurately, and a plurality of eggs can be handled with precision.

One example is U.S. Pat. No. 3,377,989 to Sandhedge in which injection needles are disposed within "egg size variation members" that are held in place by a cross bar. When the egg size variation member strikes an egg, it is permitted a slight variation of vertical travel to accommodate eggs of slightly different sizes.

Other methods are set forth in several patents assigned to the assignee of the present invention. These include U.S. Pat. Nos. 4,681,063 and 4,903,635 both to Hebrank, and U.S. Pat. No. 5,056,464 (Ser. No. 07/466,878, Filed Jan. 18, 1990) to Lewis. Each of these devices uses a novel combination of lifting eggs from their top portions, preferably by suction, in order to orient them with respect to injection needles. The Hebrank patents disclose a method of delivering fluid to the injection needles from a common supply, while the Lewis patent discloses an alternative advantageous arrangement for using a plurality of syringes associated with a respective plurality of injection needles.

In spite of the success obtained from the Hebrank and Lewis devices, however, there remains an addition problem in injecting eggs, particularly when they are delivered for injection in large groups. This problem is that when the eggs are delivered, typically in an egg tray or "flat", they may be positioned slightly off of a direct vertical orientation; i.e they are tilted. Accordingly, if the eggs are slightly tilted the ability to accurately and precisely control the travel of a needle will be somewhat lessened, even where the vertical relative travel between the egg and the needle is carefully controlled to account for differences in egg height. In other words, to date it has been difficult to accurately and precisely inject an egg with a device that includes a plurality of injection needles if an individual egg is tilted slightly off a direct vertical alignment.

OBJECT AND SUMMARY OF THE INVENTION

Therefore, it is an object of the present invention to provide an apparatus and an associated method for injecting a plurality of eggs with an appropriate injection device wherein each injection needle may be aligned with an egg not only with respect to the height of individual eggs, but also with eggs that may be misaligned with respect to the vertical, and still deliver a desired fluid as accurately and precisely as possible into each egg.

The invention meets this object with an apparatus that comprises a generally horizontally oriented tooling plate with openings therethrough. An injector rests generally vertically in each opening in the tooling plate with a lower portion of the injector depending downwardly below the tooling plate, and an upper portion of the injector resting at or above the tooling plate. Means are included for raising and lowering the tooling plate and the injector therewith so that when the plate is lowered and the lower portion of each resting injector contacts an object such as an egg, the resting injector stops and disengages from the tooling plate while the tooling plate proceeds downwardly. When the injector disengages from the tooling plate, it is free to move in a translational direction independent of the tooling plate to therefore more accurately meet the top portion of an egg that may be partially misaligned with respect to the vertical. When the tooling plate is raised, it reengages the injector and carries it upwardly and away from the egg.

The foregoing and other objects, advantages, and features of the invention, and the manner in which the same are accomplished, will become more readily apparent upon consideration of the following detailed description of the invention taken in conjunction with the accompanying drawings, which illustrate preferred and exemplary embodiments, and wherein:

DESCRIPTION OF THE DRAWINGS

FIG. 1 is a side elevational view of the overall arrangement of the apparatus including the tooling plate and the injectors;

FIG. 2 is a perspective view of the tooling plate and the injectors and in conjunction with a plurality of eggs;

FIG. 3 is a cross-sectional view of an injector according to the present invention;

FIG. 4 is a partial cross-sectional view taken along lines 4—4 of FIG. 3;

FIGS. 5 and 6 illustrate the manner in which the injector and the tooling plate can be operated to align the injector both vertically and horizontally as closely as possible to the top most portion of an egg;

FIG. 7 is a more detailed cross-sectional view of the punch and needle portion of the injectors according to the present invention;

FIG. 8 is a cross-sectional view taken along lines 8—8 of FIG. 7; and

DETAILED DESCRIPTION

Figure 9:
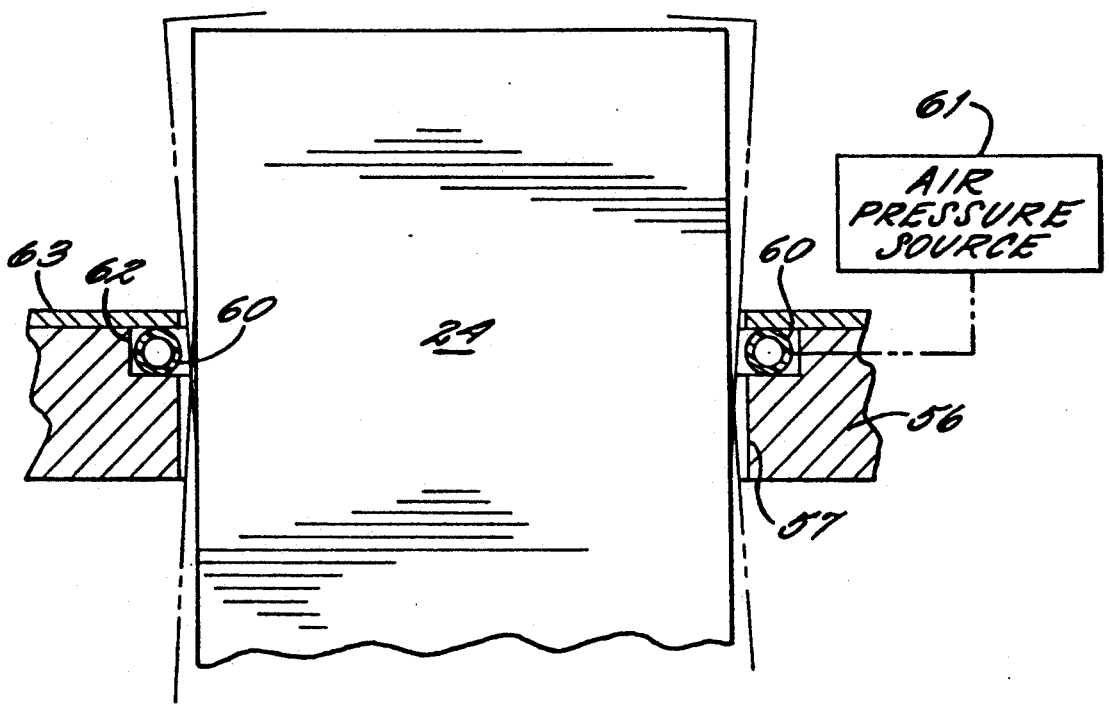
FIGS. 9 and 10 illustrate a feature of the present invention in which the injectors that are free to align themselves both vertically and horizontally with an egg can be temporarily stabilized on an egg during the injection stroke.

The present invention is illustrated in overall fashion in FIGS. 1 and 2. These illustrate that the invention comprises a generally horizontally oriented tooling plate with openings 21 therethrough. FIGS. 1 and 2 illustrate a plurality of such openings 21 in the tooling plate 20.

An injector broadly designated at 22 rests generally vertically in the opening 21 in the tooling plate 20. FIGS. 1 and 2 illustrate a plurality of injectors 22, with one injector 22 in each respective opening 21 in the tooling plate 20. A lower portion broadly designated at 23 (FIG. 3) of the injector 22 depends downwardly below the tooling plate 20 and an upper portion broadly designated at 24 rests at or above the tooling plate 20.

The invention includes means, shown as the cylinder 25, cylinder shaft 26, horizontal frame member 27, and upright shafts 28, for raising and lowering the tooling plate 20 and the injectors 22 therewith. When the tooling plate 20 is lowered and the lower portion 23 of the resting injector 22 strikes an object such as an egg to be injected, the injector 22 stops while the tooling plate 20 proceeds downwardly until the injector 22 disengages from the tooling plate 20. At this point, the injector 22 is free to move in a translational direction independent of the tooling plate 20 to seek and come to rest upon the top most portion of an egg, even if that egg is slightly tilted. When the tooling plate 20 is raised, it reengages the injector 22, straightens the injector 22 with respect to the vertical, and carries it upwardly and away from the object being injected. This sequence of operation is perhaps best illustrated by a combination of FIGS. 3, 5 and 6.

As illustrated in FIGS. 3, 5, 6 and 7, the lower portion 23 of the injector 22 further comprises a punch 31 and a needle 32 with the punch 31 surrounding the needle 32 in coaxial relationship therewith. As best illustrated in FIG. 7, both the punch 31 and the needle 32 preferably have bevelled tips for more efficient entry into an egg.

The upper portion 24 of the injector 22 further comprises a fluid driven cylinder 33 which in preferred embodiments is a double shafted, double acting air driven cylinder that drives the punch and the needle in reciprocal opposite directions between respective retracted and injecting positions (FIGS. 5 and 6). FIGS. 3, 5 and 6 illustrate the features of a preferred cylinder. The cylinder comprises a respective pair of air entry fittings 34 and 35 which are connected to respective air supply tubes or hoses 36, 37, respectively. As illustrated in FIG. 3, to drive the punch and needle downwardly, air is directed into the air hose 36 and through the air entry fitting 34 through an opening 40 in the cylinder 33. The incoming air drives the piston 41 which is illustrated with an annular seal 42 for bearing against the inner diameter of the cylinder 33. At the bottom of the piston stroke, and to desirably return the punch and needle to a retracted position, air is directed in through air hose 37 and air entry fitting 35 and travels through the housing of the cylinder 33 into lower portions thereof so as to drive the piston 41 back upwardly. The total path of travel through the cylinder of the air entering through the hose 37 and the fitting 35 is not specifically illustrated, but it will be understood that it comprises an opening analogous to the opening 40, and an associated path to the lower portion of the cylinder 33.

The use of a double acting cylinder, rather than a cylinder with a spring or other kind of biased return, provides the opportunity to make a more compact apparatus and to drive it in a more controlled fashion. It will be understood, however, that other devices such as a single stroke cylinder with a mechanically biased return, solenoid devices, or hydraulic devices, could be used in the present invention, but that the double acting cylinder is presently preferable.

FIGS. 3, 5 and 6 further illustrate that the lower portion 23 of the injector 22 comprises a cylindrical punch guide 43 which surrounds the punch 31 and the needle 32. Bottom portions of the punch guide, shown as the slightly larger diameter portion 44, extend below the needle 32 and punch 31 when the needle and punch are in a retracted position (FIGS. 3 and 5). When the needle and punch are in the injecting position (FIG. 6) the needle 32 extends below the bottom portion 44 of the punch guide 43, while the punch 31 extends to a lower position within the punch guide 43. In a preferred embodiment, this lowermost portion 44 of the punch guide 43 forms an egg receiving cup.

As set forth earlier, one of the objects of the invention is to provide a means by which the portion of the injector that meets an egg can move in a translational fashion, as well as in a vertical fashion. Part of the means for accomplishing this include the relationship between the lower portion 23 of the injector 22 and the openings 21 in the tooling plate 20. As illustrated in FIG. 3, the lower portion 23 of the injector, particularly the punch guide 43, is circular in cross-section. The opening 21 in the tooling plate 20 is also circular and has a diameter somewhat larger than the diameter of the circular cross-section of the lower portion 23. The respective difference in size between the opening 21 and the injector 22 permits the lower portion 23 of the injector 22 to move in translational fashion within the opening 21 in the tooling plate (FIG. 5).

FIG. 3 also illustrates some additional details of the preferred embodiment of the invention. These include a biasing spring 45 that acts as a flexible spacer that ensures that the punch 31 penetrates the egg before the needle 32 penetrates it. The spring is preferably strong enough to permit the punch 31 to puncture the egg, but flexible enough to be driven by the air cylinder. The spring 45 is complemented by a head portion 46 and a punch stop ring 47. At its upper portion, the spring carries a spring stop 50 that is most clearly illustrated in FIGS. 5 and 6. In addition to providing some additional mass, the spring stop 50 serves as the upper head of the spring 45 and a partial support for the turns of the spring 45.

FIGS. 3, 5 and 6 further illustrate that the punch guide 43, which is preferably formed of a polymeric material, includes the smaller diameter main portion, the larger diameter lower portion 44, and a larger diameter upper portion 51. The upper portion 51 rests in the opening 21 of the tooling plate 20. In the particular embodiment illustrated, a further cylindrical top portion of the punch guide 52 extends upwardly into the upper portion 24 of the injector 22 and is secured in place by one or more set screws 53, or any other conventional means.

As further shown in FIGS. 1 and 2, in preferred embodiments the invention further comprises means for aligning an object to be injected beneath the injectors 22 resting in the tooling plate 20. In the preferred embodiment, the object aligning means comprises means for aligning an egg beneath the injector 22 resting in the tooling plate 20, illustrated in FIGS. 1 and 2 as an egg tray or flat 54 carried by an appropriate conveyor 55. As the structure and function of both egg flats and conveyors is well known by those of skill in this art and can be selected as desired for any particular application of the invention, the operation and structure of each will not otherwise be described in any further detail.

As illustrated in majority of the drawings, the present invention further comprises a stabilizer plate 56 which is positioned above the tooling plate 20 and has one or more openings 57 therethrough. The upper portions 24 of the injectors 22 extend through these openings 57, but the injectors 22 are otherwise not attached to the stabilizer plate 56. As a result, when the injector 22 disengages from the tooling plate 20, the upper portions 24 remain oriented by the stabilizer plate 56, but are still permitted translational motion. In preferred embodiments, the tooling plate 20 and the stabilizer plate 56 are in fixed relationship to one another so that the raising and lowering means raise and lower the stabilizing plate 56 along with the tooling plate 20. As illustrated and preferred, the openings 57 and the stabilizer plate 56 are in substantial registration with the openings 21 in the tooling plate 20. It will be understood that although the preferred illustrated embodiment incorporates two separate plates 20 and 56, a single plate or block of appropriate dimensions could perform the equivalent functions.

In preferred embodiments, the openings 57 in the stabilizer plate 56 are larger than the upper portions 24 of the injectors that extend therethrough. In this embodiment, the stabilizer plate 56 further comprises releasable means for securing upper portions of each injector 22 to the stabilizer plate while the injector is injecting an egg, and then releasing the injector so that the vertical and translational movement of the injector is more independent of the stabilizer plate. In the drawings, the releasable securing means are shown as the inflatable fluid bladder portions 60 that are adjacent to the perimeter of each opening 57 in the stabilizing plate 56. The bladder 60 is inflatable to a size sufficient to contact and secure the upper portion 24 of the injector 22. When the bladder is deflated, the injector is free to move without interference from the bladder 60. As illustrated, the bladder 60 can be formed of an appropriately expandable tubing.

The securing means minimizes movement of the injector 22 during punching (including recoil and vibration) and therefore assures a more accurate punching and injection stroke. It will also be understood that although the releasable securing means has been illustrated as the bladder 60, other mechanical, electromechanical, hydraulic, or other devices could be incorporated in its place.

Figure 10:
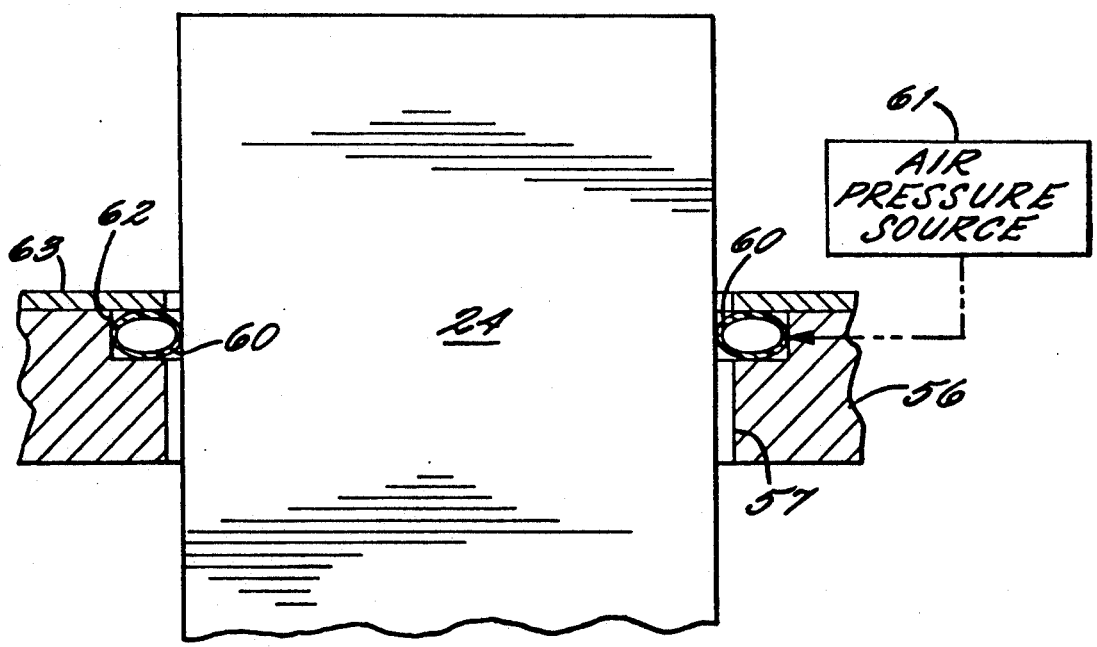

By way of further reference, FIG. 3, FIG. 5, and FIG. 9 show the bladder in its deflated orientation, while FIG. 6 and FIG. 10 show the bladder 60 inflated and stabilizing the upper portion 24 of the injector 22. As illustrated in FIGS. 9 and 10, the preferred fluid for operating the bladder is air, which can be provided from any desired or conventional air pressure source 61. As illustrated in the drawings, the bladder 60 is generally positioned in a small perimeter opening 62 that is part of, or adjacent to, the opening 57 in the stabilizer plate 56. In the illustrated embodiment the bladder 60, is held in place by a top plate 63. It will be understood, of course, that there are a number of ways to position the bladder 60 with respect to the opening 57 that are otherwise equivalent to that illustrated. Additionally, it will be further understood that a single air pressure source with appropriate controls can be used to drive the fluid driven cylinders 33 as well as the bladders 60.

FIG. 4 illustrates that in a preferred embodiment, the fluid driven cylinder 33 has a square cross-section that is somewhat larger than the opening 21 in the tooling plate 20 so that the somewhat larger cylinder portion 33 will rest on the tooling plate 20 to provide the resting relationship between the injector 22 and the plate 20 of the invention.

FIGS. 5 and 6 illustrate the particular advantages of the present invention. As background, FIG. 3, illustrates the relationship of the tooling plate 20 and the injector 22 before the plate and injectors are lowered towards an egg 64. In the orientation of FIG. 3, the injector 22 rests in the opening 21 in the plate 20, but is otherwise not fastened thereto. Similarly, the upper portions 24 of the injector 22 extend through the opening 57 in the stabilizer plate 56, but are not fastened thereto.

Given this relationship, FIG. 5 illustrates that when the tooling plate 20 is lowered, and with the stabilizing plate 56 following in the manner set forth earlier, the lowermost portion 44 of the punch guide 43 will strike an egg 64. At this point, the previously resting injector 22 is free to stop while the tooling plate 20 proceeds further downwardly until the injector 22 disengages from the tooling plate 20. At this further point, the injector 22 is free to move in a translational direction indicated by the phantom lines in FIG. 5 independently of the tooling plate 20 to thereby orient properly with respect to an egg 64 regardless of any misorientation of the egg 64. At this point, the bladder 60 is inflated to hold the injector 22 so that the injection stroke can proceed. The stroke is illustrated in FIG. 5 as partially in progress. When the bladder 60 is released and then the tooling plate 20 is raised, the tooling plate 20 reengages the injector 22 (FIG. 3) and carries it upwardly and away from the egg 64 being injected. Thus, FIG. 3 illustrates the relationship when the tooling plate 20 is moving downwardly, but the injector 22 has not yet struck an egg, as well as the relationship after an egg has been injected and tooling plate 20 has been lifted far enough to reengage the injector 22.

Returning to a slightly earlier point in the sequence, FIG. 5 illustrates the relationship just after the punch guide 43 has contacted an egg and has been free to adjust itself vertically to the height and tilt of the egg by virtue of the disengagement of the injector 22 from the tooling plate 20. Some translational movement also can take place as necessary because of the difference in size between the punch guide 43 and the opening 21, combined with the disengagement of the injector 22 from the tooling plate 20.

Although the translational movement of the injectors 22 is limited to some extent by the size of the openings 21 and 51, the translational movement available is sufficient given the generally vertical (if often slightly tilted) presentation of eggs in a typical tray or flat. Indeed, some limitation in the range of movement can be useful in keeping the overall operation of the apparatus accurate and precise.

FIGS. 6 and 10 illustrates that when the punch guide 43 has reached the proper position, the bladders 60 can be inflated to temporarily secure the upper portion 24 of the injector 22, after which the injection stroke proceeds. In other words, the bladder 60 is inflated before the injection stroke starts. Following the injection stroke, alignment is no longer critical and raising the tooling plate 20 serves to again pick up the injectors 22 and carry them away from the eggs 64.

FIGS. 5 and 6 help illustrate that in preferred embodiments the openings 21 in the tooling plate are at least partially conical and have a diameter somewhat larger than the diameter of the cylindrical punch guide which also has a conical upper portion 51 for resting in the conical opening 21.

FIGS. 7 and 8 help illustrate certain other features of the invention. First, FIG. 7 illustrates that the injector 22 includes the appropriate means for delivering a fluid to be injected from a supply to the injector. This is shown as the hose fitting 65 which surrounds upper portions of the needle 32. When an appropriate fluid hose is connected to this fitting (illustrated in FIGS. 1, 2 and 3), fluid can be appropriately delivered to the interior of the needle 32 and thus to whatever object the needle injects.

FIGS. 7 and 8 also best illustrate the means for sanitizing the needle and the punch during operation of the apparatus. As illustrated therein, a sterilizing fluid passageway 66 is defined by the annular space between the cylindrical injection needle 32 and the surrounding cylindrical punch 31. A sterilizing fluid entry fitting 67 allows the sterilizing fluid to be added to the passageway 66. In this manner, it will be understood that sterilizing fluid entering the fitting 67 will travel through the passageway 66 to clean the interior of the punch 31 and the exterior of the needle 32. As an additional feature, however, the invention further comprises fluid exit openings 70 that are adjacent to and partially above the lowermost portions of the punch 31, i.e., those portions that are most likely to enter an egg during injection. The openings 70 permit a sterilizing fluid to travel from the entry fitting 67 through the passageway 66 and then to the exterior surface of the punch 31 so that the sterilizing fluid sterilizes the passageway 66, the needle 32 and both the interior and exterior portions of the punch 31 that are most likely to enter an egg during injection.

In addition to its structural aspects, it will be understood that in another aspect the invention is a method of accurately and precisely injecting a plurality of eggs of different sizes and in which the eggs may be at least partially vertically misoriented. The method comprises positioning a plurality of egg injectors in a corresponding plurality of openings in a tooling plate, and without fixing the injectors to the plate. Portions of the injectors are smaller than the openings in the tooling plate. A plurality of eggs are positioned in substantial alignment beneath the injectors. The tooling plate is then lowered along with the injectors until the injectors contact the eggs and stop while the tooling plate is further lowered until the injectors no longer rest in the tooling plate. At this point, each injector is free to stop at a position defined by the top of each individual egg, and each injector is further free to move translationally to the extent permitted by the difference between the size of the opening in the tooling plate and the smaller size of the injector As a result, the injector can travel translationally to orient itself most accurately on the top of the egg, regardless of the position or orientation of any of the other eggs or injectors. It will be understood that the orientation on each egg is not necessarily absolutely perfect, but is a significant improvement over the prior devices.

In the drawings and specification, there have been disclosed typical preferred embodiments of the invention, and, although specific terms have been employed, they have been used in a generic and descriptive sense only and not for purposes of limitation, the scope of the invention being set forth in the following claims.

That which is claimed is:

1. An injection apparatus that is particularly suitable for accurate and precise injection of eggs to the same depth and location when the eggs are of varying sizes and may be presented to the injection apparatus in somewhat different orientations, said injection apparatus comprising:

a generally horizontally oriented tooling plate with an opening therethrough;

an injector resting generally vertically in said opening in said tooling plate with a lower portion of said injector depending downwardly below said tooling plate and an upper portion of said injector resting at or above said tooling plate; and means for raising and lowering said tooling plate and said injector therewith so that when said plate is lowered and said lower portion of said resting injector contacts an object such as an egg to be injected, said resting injector stops while said tooling plate proceeds downwardly until said injector disengages from said tooling plate and is free to move in a translational direction independent of said tooling plate, and so that when said tooling plate is raised it reengages said injector and carries it upwardly and away from the object being injected.

2. An injection apparatus according to claim 1 and further comprising means for aligning an object to be injected beneath said injector resting in said tooling plate.

3. An injection apparatus according to claim 2 wherein said object aligning means comprises means for aligning an egg beneath said injector resting in said tooling plate.

4. An injection apparatus according to claim 1 wherein said lower portion further comprises a needle and a punch surrounding said needle in coaxial relationship therewith, and said upper portion further comprises a fluid-driven cylinder that drives said punch and said needle in reciprocal opposite directions between respective retracted and injecting positions.

5. An injection apparatus according to claim 4 wherein said fluid-driven cylinder comprises a double-shafted, double acting air-driven cylinder.

6. An injection apparatus according to claim 4 wherein said lower portion further comprises a cylindrical punch guide surrounding said needle and punch and wherein bottom portions of said punch guide extend below said needle and punch when said needle and punch are in said retracted position, and wherein said needle and punch extend below said bottom portions of said punch guide when said needle and punch are in said injecting position.

7. An injection apparatus according to claim 4 and further comprising means for sanitizing said needle and punch.

8. An injection apparatus according to claim 1 and further comprising a stabilizer plate positioned above said tooling plate and having an opening therethrough through which upper portions of said injector extend, but to which said injector is otherwise not attached so that when injector disengages from said tooling plate, said upper portions remain stabilized by said stabilizer plate.

9. An injection apparatus according to claim 8 wherein said tooling plate and said stabilizer plate are in fixed relationship to one another and so that said raising and lowering means raise and lower said stabilizing plate along with said tooling plate.

10. An injection apparatus according to claim 1 wherein:
said lower portion of said injector is circular in cross section; and
said opening in said tooling plate is circular and has a diameter somewhat larger than the diameter of said circular cross section of said lower portion for permitting said lower portion of said injector to move in translational fashion within said opening in said tooling plate and to thereby move in translational fashion with respect to an egg therebeneath.

11. An injection apparatus according to claim 1 comprising a plurality of openings in said injection plate and a plurality of injectors, with one injector resting in each respective opening.

12. An injection apparatus according to claim 1 and further comprising means for delivering a fluid to be injected from a supply to said injector.

13. An egg injection apparatus that is particularly suitable for accurate and precise injection of eggs to the same depth and location when the eggs are of varying sizes and may be presented to the injection apparatus in somewhat different orientations, said injection apparatus comprising:

a generally horizontally oriented tooling plate with a plurality of openings therethrough;
a generally horizontally oriented stabilizer plate positioned above and in fixed substantially parallel relation to said tooling plate, said stabilizer plate having a plurality of openings therethrough that are in substantial registration with said openings in said tooling plate;
a plurality of injectors, each said injector having upper and lower portions, said injectors resting vertically in said openings in said horizontally oriented tooling plate, with said lower portion of each said injector depending downwardly below said tooling plate, and with said upper portion of each said injector extending above said tooling plate and through said respective openings in said stabilizer plate;
said upper portions of each said injector further comprising a double acting air cylinder;
said lower portions further comprising cylindrical injection needle, a cylindrical punch surrounding said needle, and a punch guide surrounding said punch, and wherein said needle and said punch are both driven by said air cylinder;
means for aligning a plurality of eggs beneath said tooling plate so that each egg is beneath one of said injectors; and
means for raising and lowering said tooling plate and said stabilizing plate and said injectors therewith with respect to said egg aligning means so that when said plate is lowered and said lower portion of said resting injectors strike respective eggs, said resting injectors are free to stop while said tooling plate proceeds downwardly until each said injector disengages from said tooling plate and wherein each said injector is free to move in translational directions independent of said tooling plate to thereby orient properly with respect to an egg regardless of misorientation of the egg, and so that when said tooling plate is raised it reengages said injector and carries it upwardly and away from the object being injected.

14. An egg injection apparatus according to claim 13 wherein said openings in said stabilizer plate are larger than said upper portions of said injectors that extend therethrough and wherein said stabilizer plate further comprises releasable means for securing said upper portions of each said injector to said stabilizer plate while said injector is injecting an egg, and then releasing said injector so that the vertical and translational movement of the injector is more independent of said stabilizer plate.

15. An egg injection apparatus according to claim 14 wherein said releasable securing means comprises an inflatable fluid bladder adjacent the perimeter of each said opening in said stabilizing plate, said bladder being inflatable to a size sufficient to contact and secure said upper portion of said injector, so that when said bladder is inflated it secures said injector and when said bladder is deflated, said injector is free to move without interference from said bladder.

16. An egg injection apparatus according to claim 13 wherein said punch guide comprises:
a generally cylindrical housing formed of a polymeric material, with the lowermost end of said housing forming an egg-receiving cup;
a punch stop for limiting the vertical range of travel of said punch;

a spring biased against downward travel of said needle and punch for spacing the respective travel said needle and said punch during injection of eggs therewith.

17. An egg injection device according to claim 16 wherein each said opening in said tooling plate is conical and has a diameter somewhat larger than the diameter of said cylindrical punch guide for permitting said punch guide to move in translational fashion within said opening in said tooling plate; and said punch guide has a conical upper portion for resting in said conical opening.

18. An egg injection apparatus according to claim 17 wherein said upper portions of said injectors are larger than said conical openings in said tooling plate so that when said injectors rest in said tooling plate, said upper portions will not pass through said openings and said injectors will not travel entirely through said tooling plate.

19. An egg injection apparatus according to claim 13 and further comprising means for delivering a fluid to be injected to each said injection needle.

20. An egg injection apparatus according to claim 13 and further comprising means for delivering an air supply to each said air cylinder for driving the injection and return cycles of each said air cylinder.

21. A method of accurately and precisely injecting a plurality of eggs of different sizes and that may be at least partially misoriented, the method comprising:

positioning a plurality of egg injectors in a corresponding plurality of openings in a tooling plate and without fixing the injectors to the plate, and wherein portions of the injectors are smaller than the openings in the tooling plate;

positioning a plurality of eggs beneath the injectors and in substantial alignment with the injectors; and lowering the tooling plate and the injectors until the injectors contact the eggs and stop, while continuing to lower the tooling plate until the injectors no longer rest vertically in the tooling plate, so that each injector is free to stop at a position defined by the top of each individual egg, and each injector is further free to move translationally to the extent permitted by the difference between the size of the opening in the tooling plate and the smaller size of the injector, so that the injector can travel translationally to orient itself most accurately on the top of the egg, regardless of the position or orientation of any of the other eggs or injectors.

* * * * *

UNITED STATES PATENT AND TRADEMARK OFFICE
CERTIFICATE OF CORRECTION

PATENT NO. :   5,136,979
DATED      :   August 11, 1992
INVENTOR(S):   Paul et al.

It is certified that error appears in the above-identified patent and that said Letters Patent is hereby corrected as shown below:

At column 4, line 9, "need)e" should be --needle--.

IN THE CLAIMS:

At column 11, line 2, after "travel" please insert --of--.

Signed and Sealed this

Fourteenth Day of September, 1993

Attest:

BRUCE LEHMAN

*Attesting Officer*       *Commissioner of Patents and Trademarks*